(12) United States Patent
Price

(10) Patent No.: US 11,360,220 B2
(45) Date of Patent: Jun. 14, 2022

(54) SYSTEM AND METHODS FOR PLANNING ROUTES OVER LARGE AREAS

(71) Applicant: Naval Information Warfare Center, Pacific, San Diego, CA (US)

(72) Inventor: David E. Price, San Diego, CA (US)

(73) Assignee: United States of America as represented by the Secretary of the Navy, Washington, DC (US)

(*) Notice: Subject to any disclaimer, the term of this patent is extended or adjusted under 35 U.S.C. 154(b) by 467 days.

(21) Appl. No.: 16/535,858

(22) Filed: Aug. 8, 2019

(65) Prior Publication Data

US 2021/0041577 A1 Feb. 11, 2021

(51) Int. Cl.
| | | |
|---|---|---|
| *G01S 19/40* | (2010.01) | |
| *B63B 49/00* | (2006.01) | |
| *G01C 21/20* | (2006.01) | |
| *G01S 19/42* | (2010.01) | |

(52) U.S. Cl.
CPC .......... *G01S 19/40* (2013.01); *B63B 49/00* (2013.01); *G01C 21/203* (2013.01); *G01S 19/42* (2013.01)

(58) Field of Classification Search
None
See application file for complete search history.

(56) References Cited

U.S. PATENT DOCUMENTS

| | | | | |
|---|---|---|---|---|
| 9,173,069 B2* | 10/2015 | Li | .................. | H04W 4/33 |
| 9,836,980 B2* | 12/2017 | Sommer | .............. | G05D 1/0212 |
| 10,466,058 B2* | 11/2019 | Grimm | .............. | G01C 21/3446 |
| 2015/0362321 A1* | 12/2015 | Carnevali | .............. | G01C 21/20 |
| | | | | 701/533 |
| 2020/0109950 A1* | 4/2020 | Jhuang | ................. | G01C 21/203 |

OTHER PUBLICATIONS

Song, Rui. Smoothed A* Algorithm for Practical Unmanned Surface Vehicle Path Planning, Department If Mechanical Engineering, Feb. 2019 (Year: 2019).*
http://www.stormgeo.com/solutions/shipping/on-board-services/navigational-planning/ (downloaded Feb. 29, 2019).

* cited by examiner

*Primary Examiner* — Aniss Chad
*Assistant Examiner* — Mahmoud M Kazimi
(74) *Attorney, Agent, or Firm* — Naval Information Warfare Center Pacific; Kyle Eppele; James R. McGee

(57) ABSTRACT

A route planning system and methods involving: a processor operable by executable instructions, the instructions having cooperating algorithms, the cooperating algorithms having an A* algorithm, an IA* algorithm cooperatively communicating with the A* algorithm; and a Dijkstra algorithm cooperatively communicating with the IA* algorithm, the IA* algorithm configured to iteratively and recursively call the A* algorithm to generate directed arcs, the IA* algorithm configured to call the Dijkstra algorithm and to transmit the directed arcs to the Dijkstra algorithm, and the A* algorithm and the Dijkstra algorithm being non-interacting; and an automatic identifications systems transceiver disposed in relation to a vessel, the transceiver configured to receive global positioning system signals and calculate a current position of the vessel in relation to Earth, the AIS transceiver configured to communicate with the processor.

20 Claims, 8 Drawing Sheets

10 — A PROCESSOR OPERABLE BY WAY OF A SET OF EXECUTABLE INSTRUCTIONS STORABLE IN RELATION TO A NON-TRANSIENT MEMORY DEVICE, THE SET OF INSTRUCTIONS COMPRISING A PLURALITY OF COOPERATING ALGORITHMS, THE PLURALITY OF COOPERATING ALGORITHMS COMPRISING AN A* ALGORITHM, AN IA* ALGORITHM COOPERATIVELY COMMUNICATING WITH THE A* ALGORITHM: AND A DIJKSTRA ALGORITHM COOPERATIVELY COMMUNICATING WITH THE A* ALGORITHM AND THE IA* ALGORITHM, THE IA* ALGORITHM CONFIGURED TO ITERATIVELY AND RECURSIVELY CALL THE A* ALGORITHM TO GENERATE A PLURALITY OF DIRECTED ARCS, THE IA* ALGORITHM CONFIGURED TO CALL THE DIJKSTRA ALGORITHM AND TO TRANSMIT THE PLURALITY OF DIRECTED ARCS TO THE DIJKSTRA ALGORITHM, AND THE A* ALGORITHM AND THE DIJKSTRA ALGORITHM BEING NON-INTERACTING

15 — AN AUTOMATIC IDENTIFICATIONS SYSTEMS (AIS) TRANSCEIVER DISPOSED IN RELATION TO A VESSEL, THE AIS TRANSCEIVER CONFIGURED TO RECEIVE GLOBAL POSITIONING SYSTEM SIGNALS AND CALCULATE A CURRENT POSITION OF THE VESSEL IN RELATION TO EARTH, THE AUTOMATIC IDENTIFICATIONS TRANSCEIVER CONFIGURED TO COMMUNICATE WITH THE PROCESSOR

FIG. 11

SYSTEM AND METHODS FOR PLANNING ROUTES OVER LARGE AREAS

FEDERALLY-SPONSORED RESEARCH AND DEVELOPMENT

The United States Government has ownership rights in the subject matter of the present disclosure. Licensing inquiries may be directed to Office of Research and Technical Applications, Naval Information Warfare Center, Pacific, Code 72120, San Diego, Calif., 92152; telephone (619) 553-5118; email: ssc_pac_t2@navy.mil. Reference Navy Case No. 109260.

TECHNICAL FIELD

The present disclosure technically relates to planning routes for vessels. Particularly, the present disclosure technically relates to quickly planning routes for vessels around obstacles over large areas.

BACKGROUND OF THE INVENTION

In the related art, various approaches for planning routes are used in relation to large commercial vessels. For example, a STORMGEO® software package follows steps and protocols for voyage planning defined in the International Maritime Organization's (IMO) Resolution A.893 (21), "Guidelines for Voyage Planning," wherein four stages of planning a voyage are applied. These four planning stages are: appraising all information; planning the intended voyage; executing the plan, considering special circumstances, such as weather changes; and continuously monitoring the vessel's progress against the planned voyage. The STORMGEO® software package also considers a vessel's specifications, such as vessel type, age, stability, cargo, and speed, as well as environmental factors, such as weather and ocean currents. Further, related art artificial intelligence search algorithms that are typically used in the shipping industry, many of which compute an "optimal" path, are computationally complex and time-consuming, thereby rendering such related art algorithms unusable on a global scale.

In the related art, a wide variety of artificial intelligence (AI) path-finding algorithms are used. Many of these guarantee an optimal (shortest) route; however, these related art path-finding algorithms must search all possible paths that could be shorter which requires enormous computational resources to plan a route on any large scale.

Challenges experienced in the related art voyage planning an inability to plan a route around an obstacle, such as a moving obstacle. Therefore, a need exists in the related art for the improving voyage planning techniques.

SUMMARY OF INVENTION

To address at least the needs in the related art, a route planning system involves a processor that is operable by way of a set of executable instructions storable in relation to a nontransient memory device, the set of instructions comprising a plurality of cooperating algorithms, the plurality of cooperating algorithms comprising an A* algorithm, an IA* algorithm cooperatively communicating with the A* algorithm; and a Dijkstra algorithm cooperatively communicating with the IA* algorithm, the IA* algorithm configured to iteratively and recursively call the A* algorithm to generate a plurality of directed arcs, the IA* algorithm configured to call the Dijkstra algorithm and to transmit the plurality of directed arcs to the Dijkstra algorithm, and the A* algorithm and the Dijkstra algorithm being non-interacting; and an automatic identification system (AIS) transceiver disposed in relation to a vessel, the AIS transceiver configured to receive global positioning system signals and calculate a current position of the vessel in relation to Earth, the AIS transceiver configured to communicate with the processor, in accordance with an embodiment of the present disclosure.

BRIEF DESCRIPTION OF THE DRAWING(S)

The above, and other, aspects, features, and benefits of several embodiments of the present disclosure are further understood from the following Detailed Description of the Invention as presented in conjunction with the following several figures of the Drawing.

FIG. 1 is a map illustrating an A* route or path as a function of longitude and latitude, as determined by executing an A* algorithm in relation to a forward search (from a start-point to a goal-point) using parameters, such as the start-point, the goal-point, and a location of a barrier or an obstacle (as a function of time if the barrier or the obstacle is moving), in accordance with an embodiment of the present disclosure.

FIG. 2 is a map illustrating an A* route or path as a function of longitude and latitude, determined by executing an IA* algorithm in relation to a forward search (from a start-point to a goal-point) parameters, such as the start-point, the goal-point, and a location of a barrier or an obstacle (as a function of time if the barrier or the obstacle is moving), whereby way-points are created, in accordance with an embodiment of the present disclosure.

FIG. 3 is a map illustrating an IA* route or path as a function of longitude and latitude, determined by executing an IA* algorithm in relation to a forward search (from a start-point to a goal-point) to parameters, such as the start-point, the goal-point, and a location of a barrier or an obstacle (as a function of time if the barrier or the obstacle is moving), whereby a set of directed arcs between way-points are created, in accordance with an embodiment of the present disclosure.

FIG. 4 is a map illustrating an A* route or path as a function of longitude and latitude, determined by executing an A* algorithm in relation to a reverse search (from a goal-point to a start-point) using parameters, such as the start-point, the goal-point, and a location of a barrier or an obstacle (as a function of time if such the barrier or the obstacle is moving), in accordance with an embodiment of the present disclosure.

FIG. 5 is a map illustrating an IA* route or path as a function of longitude and latitude, determined by executing an A* algorithm implementable in relation to a reverse search (from a goal-point to a start-point) using parameters, such as the start-point, the goal-point, and a location of a barrier or an obstacle (as a function of time if the barrier or the obstacle is moving), whereby way-points are created, in accordance with an embodiment of the present disclosure.

FIG. 6 is a map illustrating an A* route or path as a function of longitude and latitude, determined by executing an A* algorithm on a second iteration, in relation to a reverse search (from a goal-point to a start-point) using parameters, such as the start-point, the goal-point, a location of a barrier or an obstacle (as a function of time if the barrier or the obstacle is moving), wherein a sub-path or a sub-route is provided while iteratively calculating through a first set of way-points along a reverse path or a route, whereby at least one new way-point is provided, in accordance with an embodiment of the present disclosure.

FIG. 7 is a map illustrating an IA* route or path as a function of longitude and latitude, determined by a executing an A* algorithm on a second iteration in relation to a reverse search (from a goal-point to a start-point) using parameters, such as the start-point, the goal-point, and a location of a barrier or an obstacle (as a function of time if such the barrier or the obstacle is moving), wherein a sub-path or sub-route is provided while iteratively calculating through a first set of way-points along a reverse path or a reverse route, whereby at least one new way-point is created, in accordance with an embodiment of the present disclosure.

FIG. 8 is a map illustrating an IA* route or path as a function of longitude and latitude, determined by executing an A* algorithm and an IA* algorithm, in relation to a reverse search (from a goal-point to a start-point) using parameters, such as the start-point, the goal-point, a location of a barrier or an obstacle (as a function of time if the barrier or the obstacle is moving), wherein a set of directed arcs are created while iteratively calculating through a set of way-points along a reverse path or a reverse route, whereby a plurality of directed arcs is provided, in accordance with an embodiment of the present disclosure.

FIG. 9 is a map illustrating all of the directed arcs generated by the IA* algorithm as a function of longitude and latitude, using parameters, such as the start-point, the goal-point, and a location of a barrier or an obstacle (as a function of time if the barrier or the obstacle is moving), in accordance with an embodiment of the present disclosure.

FIG. 10 is a map illustrating an IA* route or path as a function of longitude and latitude, determined by executing an IA* algorithm and a Dijkstra algorithm, using parameters, such as the start-point, the goal-point, and a location of a barrier or an obstacle (as a function of time if the barrier or the obstacle is moving), wherein the directed arcs, as shown in red, represent the shortest path through the directed arcs as returned by the Dijkstra algorithm, in accordance with an embodiment of the present disclosure.

FIG. 11 is a schematic diagram illustrating a route planning system, in accordance with an embodiment of the present disclosure.

Figure 1:
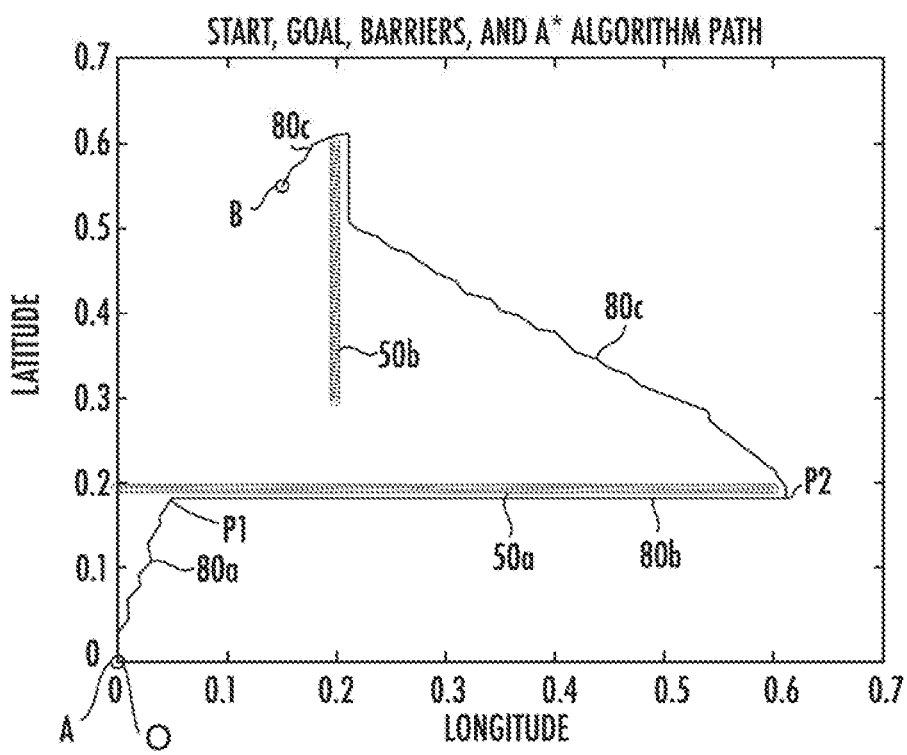

Corresponding reference numerals or characters indicate corresponding components throughout the several figures of the Drawing. Elements in the several figures are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood, elements that are useful or necessary in commercially feasible embodiment are often not depicted in order to facilitate a less obstructed view of these various embodiments of the present disclosure.

DETAILED DESCRIPTION OF THE EMBODIMENT(S)

Generally, the present disclosure involves a system and methods for planning a route over a large area, the system comprising a processor operable by way of a set of executable instructions storable in relation to a nontransient memory device, the instructions comprising an A* algorithm ("A*"), an Iterative A* algorithm ("IA*"), and a Dijkstra algorithm ("Dijkstra"). The system of the present disclosure is configured to rapidly plan at least one route across a large area, such as an ocean, even around an obstacle, and even around a moving obstacle, whereby finding a best or optimum path is achievable, and whereby the best or optimum path may comprise a shortest path or a shortest path in relation to at least one obstacle. In addressing a challenge experienced by the related art, the system and methods of the present disclosure use the A* algorithm in combination with IA* algorithm, whereby time for planning a route is faster than that of the related art AI route planning algorithms using techniques, such as complex heuristics, a breadth-first search, and a depth-first search, and a complete search through all possible paths. In accordance with the present disclosure, a method of planning a route over a large area involves rapidly computing the route using data having a fine-grain resolution. By example only, the system of the present disclosure is configured to plan a route from a start-point located at 35 N, 5 E, around a large obstacle, to a goal-point B located at 15 N, 135 E, in less than 15 seconds. The system and methods of the present disclosure calculate routes on a global scale more rapidly than related art voyage planning systems and methods.

Referring to FIG. 1, this map illustrates an A* route or path, e.g., a virtual vessel pathway, as a function of longitude and latitude, determined by a system S, in accordance with an embodiment of the present disclosure. The system S comprises a processor 10 that is operable by way of a set of executable instructions that is storable in relation to a nontransient memory device (not shown). The processor 10 is interfaceable with any external device, such as global Positioning System (GPS) system, a data storage device, an external input device, and an external output device, a graphic user interface device, such as a display device, a keyboard, a mouse, and the like. The data storage device comprises a nontransient memory device or any suitable data storage device, such as included with a remote computing device, e.g., a computer, a hard drive, a digital media device, and a server. The data storage device may also comprise a plurality of memory devices. The set of instructions comprises a plurality of cooperating algorithms (FIG. 11). The plurality of cooperating algorithms comprises an A* algorithm, an IA* algorithm, and a Dijkstra algorithm, the IA* algorithm configured to iteratively and recursively call the A* algorithm to generate a plurality of directed arcs, the IA* algorithm configured to call the Dijkstra algorithm and to transmit the plurality of directed arcs to the Dijkstra algorithm, and the A* algorithm and the Dijkstra algorithm being non-interacting.

Still referring to FIG. 1, the A* algorithm is implementable in relation to a forward search (from a start-point A to a goal-point B) using parameters, such as the start-point A located at an origin O, the goal-point B, and a location of an obstruction, e.g., an obstruction 50 and an obstruction 50b, e.g., a barrier or an obstacle (as a function of time t if the obstruction is moving). A virtual vessel pathway path, e.g., a path 80a, is returned by the A* algorithm 41 when searching for a "shortest" path from the origin O or the start-point A to the goal-point B. The A* search defines a path 80a which directly heads toward the goal-point B. When the A* search "hits" or encounters an obstruction 50a at a point P1, the A* algorithm finds a path 80b around the obstruction 50a. Once the A* algorithm has cleared the obstruction 50a, e.g., finds a path 80c around the obstruction 50a at a point P2, the A* algorithm resumes a direct path, e.g., the path 80c, to the goal-point B from the point P2 where the A* search has cleared the obstruction 50a. The A* algorithm continues performing the foregoing computation until the A* search reaches the goal-point B.

Figure 2:
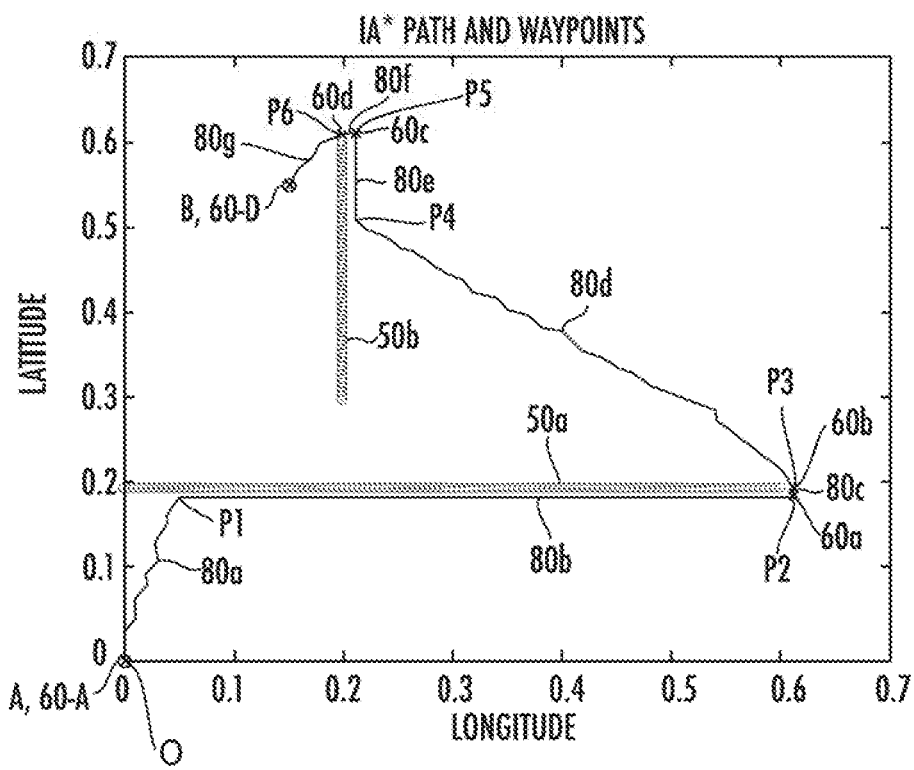

Referring to FIG. 2, this map illustrates an IA* route or path as a function of longitude and latitude, determined by a system S, in accordance with an embodiment of the present disclosure. The system S comprises a processor 10 that is operable by way of a set of executable instructions that is storable in relation to a nontransient memory device. The set of instructions comprises a plurality of cooperating algorithms (FIG. 11). The plurality of cooperating algorithms comprises an A* algorithm, an IA* algorithm, and a Dijkstra algorithm. The IA* algorithm is implementable in relation to a forward search (from a start-point A to a goal-point B) using parameters, such as a start-point A, a goal-point B, and a location of an obstruction, e.g., a barrier or an obstacle (as a function of time t if the obstruction is moving), whereby way-points are created.

Still referring to FIG. 2, the IA* algorithm commences execution by tracking the direction of travel with respect to the direction to the goal-point B. The IA* algorithm takes no action when the "agent" of 'virtual vessel" is headed towards the goal-point B. When the IA* algorithm observes the agent turning away from its goal-point B (such as when following the edge of an obstruction 50a), the IA* algorithm commences seeking turns back towards the goal-point B. At each location that the IA* algorithm observes a turn-back toward the goal-point B, a way-point is created. For instance, in FIG. 2, an agent (a virtual agent) moves along the path 80a directly toward the goal-point B until the agent reaches a point P1, defined by a set of latitude and longitude coordinates (0.19, 0.05), where the agent encounters an obstruction 50a to the path 80a. The agent then turns away from the goal-point B and travels along a path 80b and proceeds to a point P2, defined by a set of latitude and longitude coordinates (0.19, 0.61). At the point P2, the agent turns to a direction closer to a direct path to the goal-point B, and a way-point 60a is created at the point P2, defined by a set of latitude and longitude coordinates (0.19, 0.61). The agent merely turns toward the goal-point B, e.g., the agent need not return to a direct path towards the goal-point B. The agent moves along a path 80c to a point P3, defined by a set of latitude and longitude coordinates (0.21, 0.61), and, again, turns towards the goal-point B, thereby creating another way-point 60b at the point P3, defined by a set of latitude and longitude coordinates (0.21, 0.61). The agent is now on a virtual vessel pathway 80d leading directly toward the goal-point B and follows the path 80d until the agent reaches a point P4, defined by a set of latitude and longitude coordinates (0.51, 0.21), where the agent is again required to turn away by an obstruction 50b from a direct path, e.g., the path 80d, towards its goal-point B. The agent follows the edge of the obstruction 50b along a path 80e until the agent reaches a point P5, defined by a set of latitude and longitude coordinates (0.61, 0.21), where the agent turns back toward a direct path to the goal-point B; and a way-point 60c is created. The agent then moves along a path 80f to a point P6, defined by a set of latitude and longitude coordinates (0.61, 0.20). and turns towards its goal-point B, thereby creating another way-point 60d. The start-point A and the goal-point B are also deemed as way-points 60-A, 60-B, respectively.

Figure 3:
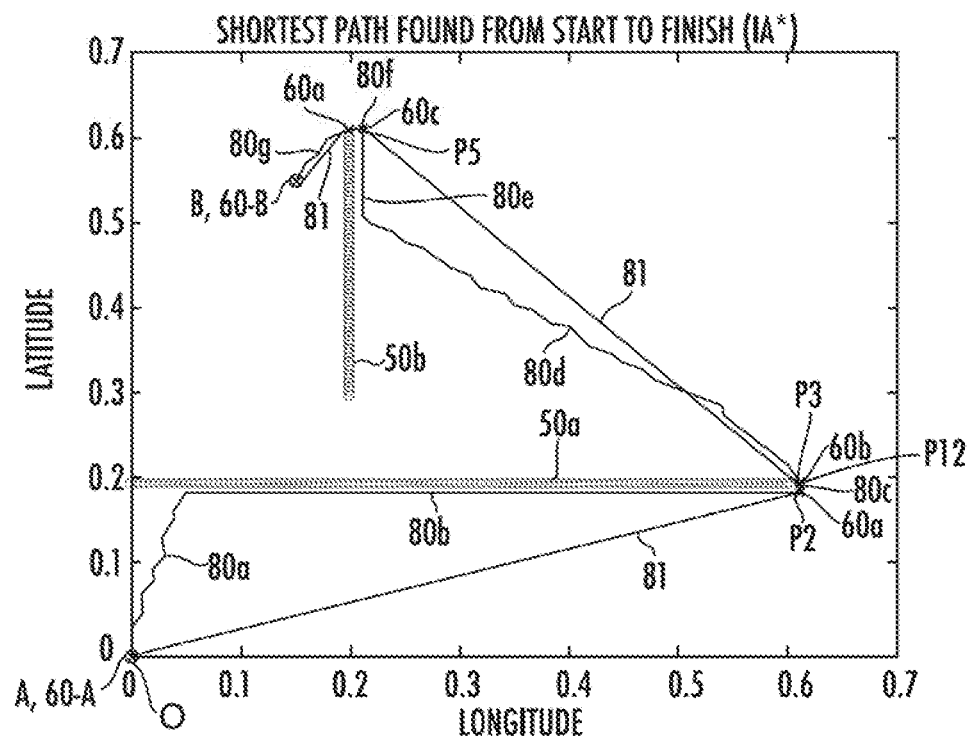

Referring to FIG. 3, this map illustrates an IA* route or path as a function of longitude and latitude, determined by a system S, in accordance with an embodiment of the present disclosure. the system S comprises a processor 10 that is operable by way of a set of executable instructions that is storable in relation to a nontransient memory device. The set of instructions comprises a plurality of cooperating algorithms (FIG. 11). The plurality of cooperating algorithms comprises an A* algorithm, an IA* algorithm, and a Dijkstra algorithm. the IA* algorithm is implementable in relation a forward search (from a start-point A to a goal-point B) along a path using parameters, such as a start-point A, a goal-point B, and a location of an obstruction (as a function of time t if the obstruction is moving), whereby way-points are created, and whereby a shortest path or a shortest route is planned from the start-point A to the goal-point B, e.g., initially.

Still referring to FIG. 3, next, the IA* algorithm iterates through this set of way-points looking for paths between any pair of way-points. For instance, the IA* algorithm would check for paths between the following pairs of points: a start-point A, defined by a set of latitude and longitude coordinates (0.00, 0.00), and a point P2, defined by a set of latitude and longitude coordinates (0.19, 0.61); a start-point A, defined by a set of latitude and longitude coordinates (0.00, 0.00), and a point P12, defined by a set of latitude and longitude coordinates (0.21, 0.61); and a start-point A, defined by a set of latitude and longitude coordinates (0.00, 0.00), and a point P5, defined by a set of latitude and longitude coordinates (0.61, 0.21); . . . ; a point P2, defined by a set of latitude and longitude coordinates (0.19, 0.61), and a point P12, defined by a set of latitude and longitude coordinates (0.21, 0.61); a point P2, defined by a set of latitude and longitude coordinates (0.19, 0.61), and a point P5, defined by a set of latitude and longitude coordinates (0.61, 0.21), . . . etc. If an obstruction is found between two way-points, the IA* algorithm searches for more way-points by recursively restarting this process. However, if the new path reaches a different existing way-point, the search for a path between those two existing way-points is terminated.

Still referring to FIG. 3, for example, searching for a path from the start-point A, defined by coordinates (0.00, 0.00), to the point P3, defined by coordinates (0.20, 0.61) will encounter the way-point 60a at (0.19, 0.61) before the search reaches the point P3, defined by coordinates (0.20, 0.61). Whenever a direct path between two way-points (no obstructions) is found, a directed arc 81 (farther from the goal-point B along this path to closer to the goal-point B) is created connecting the two way-points. Once all of the way-points that can be connected by a directed arc 81 are connected, the process completes; and the directed arcs 81 are returned. These directed arcs form one or more paths from the start point to the goal point. As shown in FIG. 3, five directed arcs form a single path from the starting point to the goal point, forming the path from the sets of latitude-longitude pairs (0.0, 0.0) to (0.19, 0.61), from (0.19, 0.61) to (0.21, 0.61), from (0.21, 0.61) to (0.61, 0.21), from (0.61, 0.21) to (0.61, 0.19), and from (0.61, 0.19) to (0.55, 0.15). The A* algorithm is a "greedy" algorithm and does not guarantee the shortest path from its initial point to its destination. Therefore, once all directed arcs 81 have been found from the start-point A to the goal-point B, the A* algorithm recommences the search with the goal-point B as the initial point and the start-point A as the destination point. This second search uses none of the previous way-points 60 and may find an alternate path.

Figure 4:
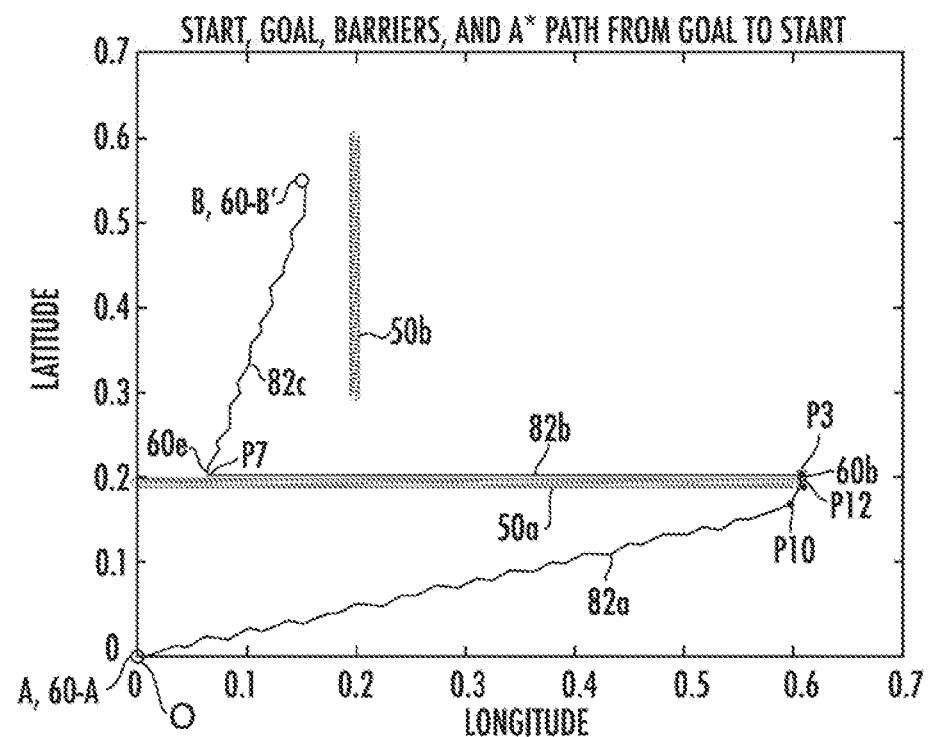

Referring to FIG. 4, this map illustrates an A* route or path as a function of longitude and latitude, determined by a system S, in accordance with an embodiment of the present disclosure. The system S comprises a processor 10 that is operable by way of a set of executable instructions that is storable in relation to a nontransient memory device. The set of instructions comprises a plurality of cooperating algorithms (FIG. 11). The plurality of cooperating algorithms comprises an A* algorithm, an IA* algorithm, and a Dijkstra algorithm. The A* algorithm is implementable in relation to a reverse search (from a goal-point to a start-point) along a path using parameters, such as the start-point, the goal-point, and a location of an obstruction, e.g., a barrier or an obstacle (as a function of time t if the obstruction is moving).

Still referring to FIG. 4, in executing the A* algorithm as a reverse search, a path 82c from a start-point set, e.g., at point 60-B' (0.55,0.15), is followed by the agent. The path 82c heads directly for the destination at the origin O, having coordinates (0, 0), until the agent reaches the obstruction 50a at a point P7, having latitude-longitude coordinates (0.21, 0.06). The agent then follows the edge of the obstruction 50a to a point P3, having coordinates (0.21, 0.61), wherein the agent turns south around the end of the obstruction 50a. The agent then moves to a point P12 having coordinates (0.20, 0.61), turns to the south-southwest to reach a point P10 (0.18, 0.60), and then turns directly toward the goal at the origin O, having the coordinates (0.0, 0.0).

Figure 5:
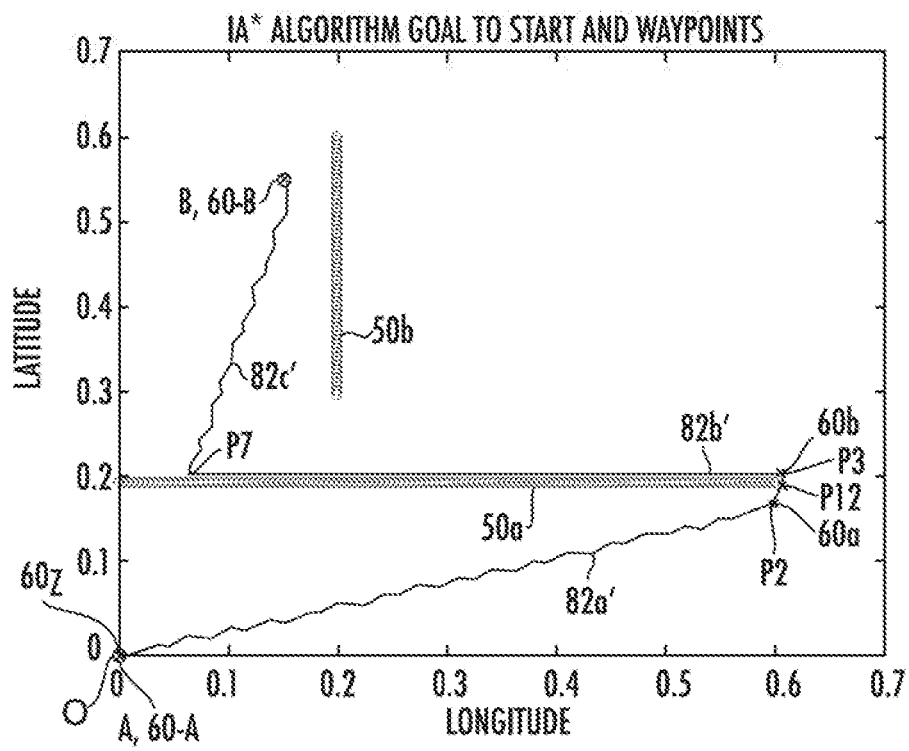

Referring to FIG. 5, this map illustrates an IA* route or path as a function of longitude and latitude, determined by a system S, in accordance with an embodiment of the present disclosure. The system S comprises a processor 10 that is operable by way of a set of executable instructions that is storable in relation to a nontransient memory device. The set of instructions comprises a plurality of cooperating algorithms (FIG. 11). The plurality of cooperating algorithms comprises an A* algorithm, an IA* algorithm, and a Dijkstra algorithm. The A* algorithm is implementable in relation to a reverse search (from a goal-point B to a start-point A) along paths 82c', 82b', 82a' using parameters, such as the start-point A, the goal-point B, and a location of an obstruction, e.g., a barrier or an obstacle (as a function of time t if the obstruction is moving), whereby way-points are created. The IA* algorithm follows the direct path 82c' created by A*, reaching the obstruction 50a at the point P7, having the coordinates (0.21, 0.06). The agent then turns away from the direct path 82c' and moves along the edge of the obstruction 50a along the path 82b' to the point P3, having coordinates (0.21, 0.61), where the agent turns towards a path 82a' closer to the direct path 82c' to the destination, e.g., the goal-point at the origin O, having the coordinates (0, 0); and a way-point 60b is created at coordinates (0.21, 0.61). The agent then reaches a point P12, having coordinates (0.20, 0.61), where the agent again, at a point P2, defined by a set of latitude and longitude coordinates (0.19, 0.61), turns towards the goal-point at the origin O; and a way-point 60a is created. The agent reaches the point, having coordinates (0.18, 0.60), along the path 82a', where the agent can turn directly toward the destination, the at the origin O; and a new way-point 60z is created. A feature of the system S allows the agent to move in sixteen possible directions. For example, the agent jumps to a location having the coordinates (0.18, 0.60) by moving down two grid rows and across one grid column. The agent then reaches the destination, e.g., the goal-point at the origin O.

Figure 6:
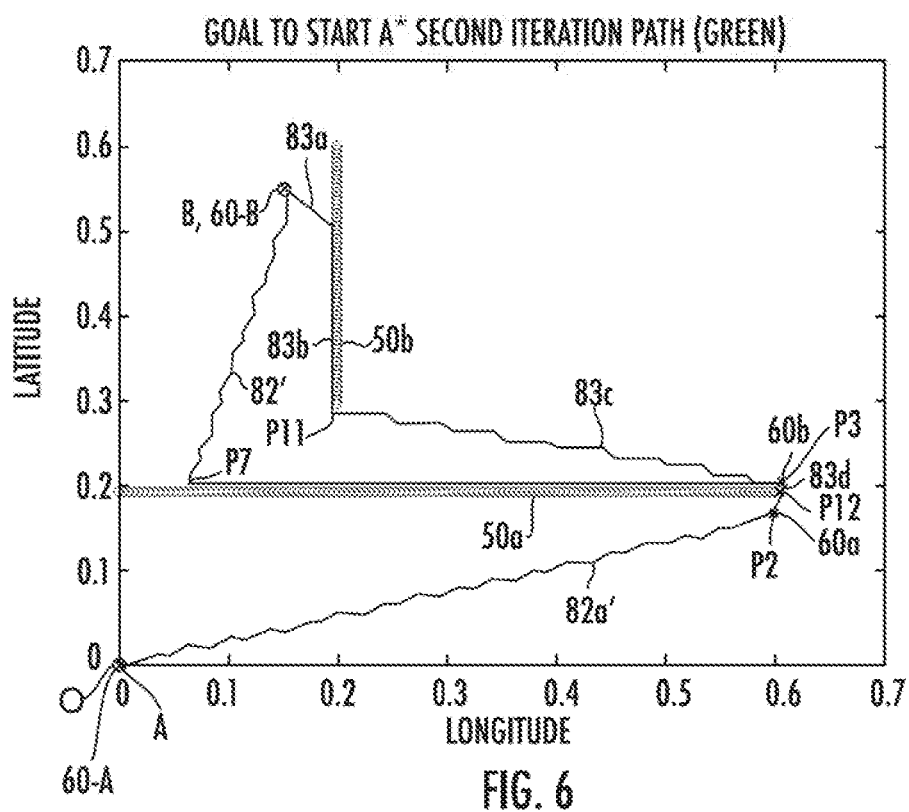

Referring to FIG. 6, this map illustrates an A* route or path as a function of longitude and latitude, determined by a system S, in accordance with an embodiment of the present disclosure. The system S comprises a processor 10 that is operable by way of a set of executable instructions that is storable in relation to a nontransient memory device. The set of instructions comprises a plurality of cooperating algorithms (FIG. 11). The plurality of cooperating algorithms comprises an A* algorithm, an IA* algorithm, and a Dijkstra algorithm. The A* algorithm is implementable via a through the way-points generated by a reverse search (from a goal-point B to a start-point A) using parameters, such as the start-point A, the goal-point B, and a location of an obstruction, e.g., a barrier or an obstacle (as a function of time t if the obstruction is moving), wherein a sub-path or sub-route, e.g., paths 83a, 83b, 83c, is provided while iteratively calculating through a first set of way-points along a reverse path or a reverse route, whereby at least one new way-point is provided. The algorithm begins to iterate through the way-points, looking for direct paths. The first pair of way-points 60-B and 60b respectively have coordinates (0.55, 0.15) and (0.21, 0.61). The A* algorithm generates a path that goes straight towards a goal until the agent reaches the obstruction 50b, having coordinates (0.51, 0.19), where the agent turns south and follows the edge of the obstruction 50b along a path 83b until the agent reaches a point P11, having coordinates (0.29, 0.19). The agent then turns around the southern end of the obstruction 50b along a path 83c and travels directly to the goal at point P3 having coordinates (0.21, 0.61).

Figure 7:
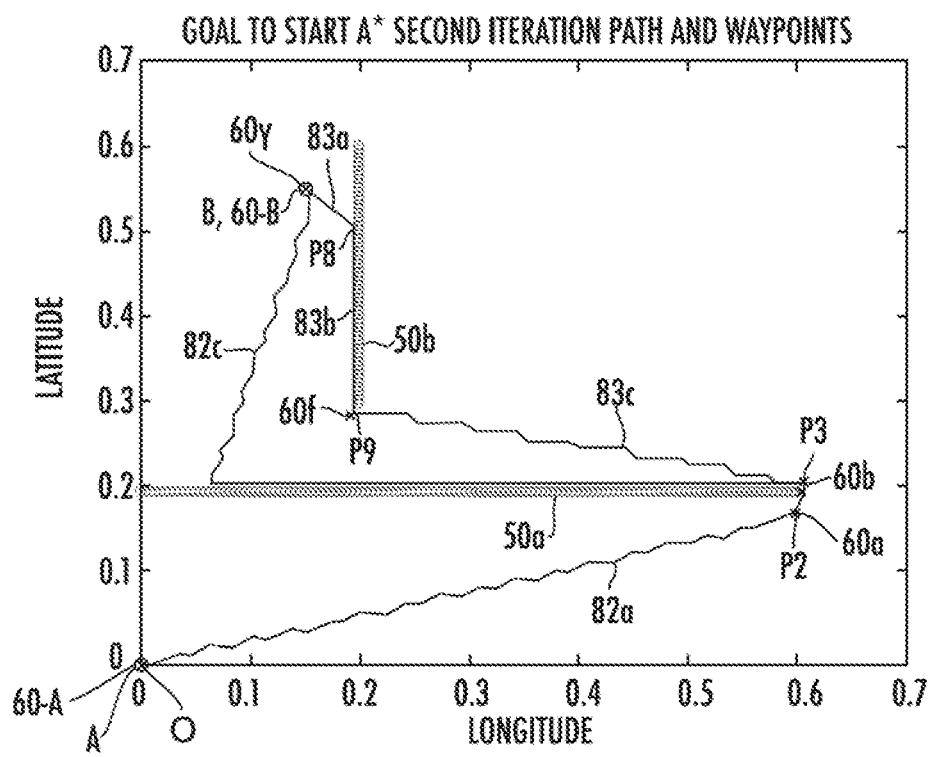

Referring to FIG. 7, this map illustrates an IA* route or path as a function of longitude and latitude, determined by a system S, in accordance with an embodiment of the present disclosure. The system S comprises a processor 10 that is operable by way of a set of executable instructions that is storable in relation to a nontransient memory device. The set of instructions comprises a plurality of cooperating algorithms (FIG. 11). The plurality of cooperating algorithms comprising an A* algorithm, an IA* algorithm, and a Dijkstra algorithm. The A* algorithm is implementable via a second iteration in relation to a reverse search (from a goal-point B to a start-point A) using parameters, such as the start-point A, the goal-point B, and a location of an obstruction, e.g., a barrier or an obstacle (as a function of time t if the obstruction is moving), wherein a sub-path or sub-route, e.g., paths 83a, 83b, 83c, is provided while iteratively calculating through a first set of way-points 60 along a reverse path or a reverse route, whereby at least one other new way-point 61 is provided. The agent quickly runs into the obstruction 50b, when the agent reaches a point P8, having coordinates (0.51, 0.19), and then follows the obstruction 50b on the path 83b down to a point P9, having coordinates (0.29, 019). At the point P9, the agent turns towards the destination, e.g., set at the point P3, and a new way-point 60f is added. Through this process, way-points are found to plan direct paths between such way-points along the entire route. Once direct paths have been found between a pair of way-points, e.g., between the way-point 60y at a point 60-B, having coordinates (0.55, 0.15) and the way-point 60f at a point P11, having coordinates (0.29, 0.19), a directed arc is created connecting the two way-points 60y, 60f. Since these directed arcs are found during the reverse search, the directed arc is created from the destination of the direct path back towards the starting point of the direct path, e.g., from the point P11, having coordinates (0.29, 0.19) to the point 60-B, having the coordinates (0.55, 0.15).

Figure 8:
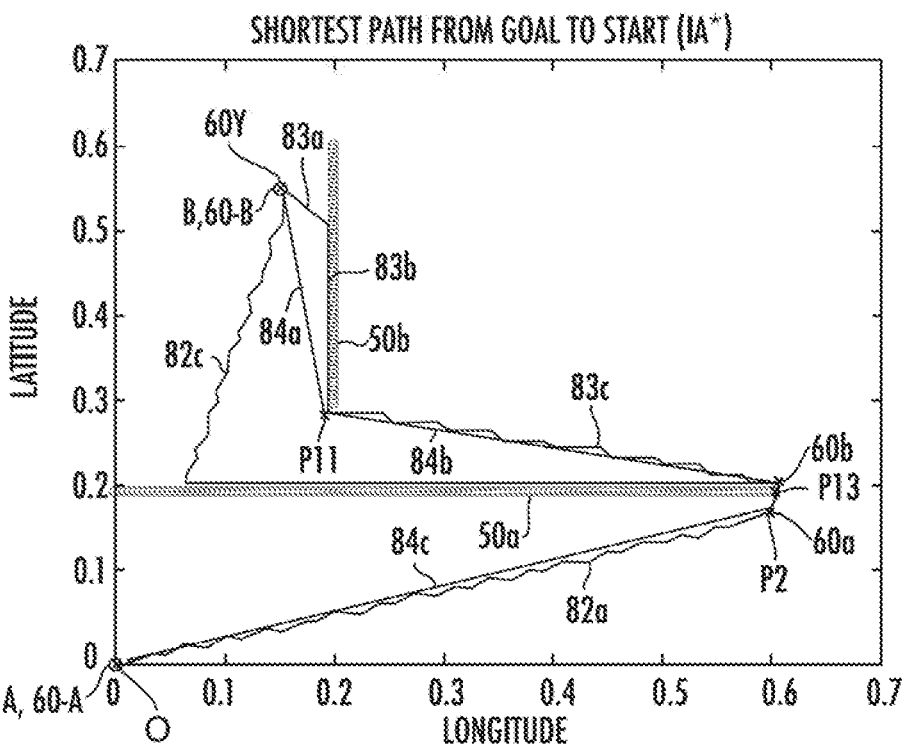

Referring to FIG. 8, this map illustrates an IA* route or path as a function of longitude and latitude, determined by a system S, in accordance with an embodiment of the present disclosure. The system S comprises a processor 10 that is operable by way of a set of executable instructions that is storable in relation to a nontransient memory device. The set of instructions comprises a plurality of cooperating algorithms (FIG. 11). The plurality of cooperating algorithms, comprising an A* algorithm, an IA* algorithm, and a Dijkstra algorithm. The IA* algorithm is implementable in relation to a reverse search (from a goal-point B to a start-point A) using parameters, such as the start-point A, the goal-point B, and a location of an obstruction 50, e.g., a barrier or an obstacle (as a function of time t if the obstruction 50 is moving),), wherein the IA* algorithm has created way-points, and wherein the directed arcs that connect the way-points are found, whereby at least one path through the directed arcs that leads from the starting point to the goal point is determined. For the reverse search, the waypoints are directed from the destination way-point of the direct path back to the starting way-point of that direct path. As shown in FIG. 8, the five directed arcs, e.g., corresponding to the paths 83a, 83b, 84a, 84b, 84c, and 84d, are found during the reverse search, starting from the origin O, having the coordinates (0.0, 0.0), to a point, having coordinates (0.18, 0.60), from a point having coordinates (0.18, 0.60) to a point having coordinates (0.20, 0.61), from a point having coordinates (0.20, 0.61) to a point having coordinates (0.21, 0.61), from a point having coordinates (0.21, 0.61) to a point having coordinates (0.29, 0.19), and from a point having coordinates (0.29, 0.19) to a point having coordinates (0.55, 0.15).

Figure 9:
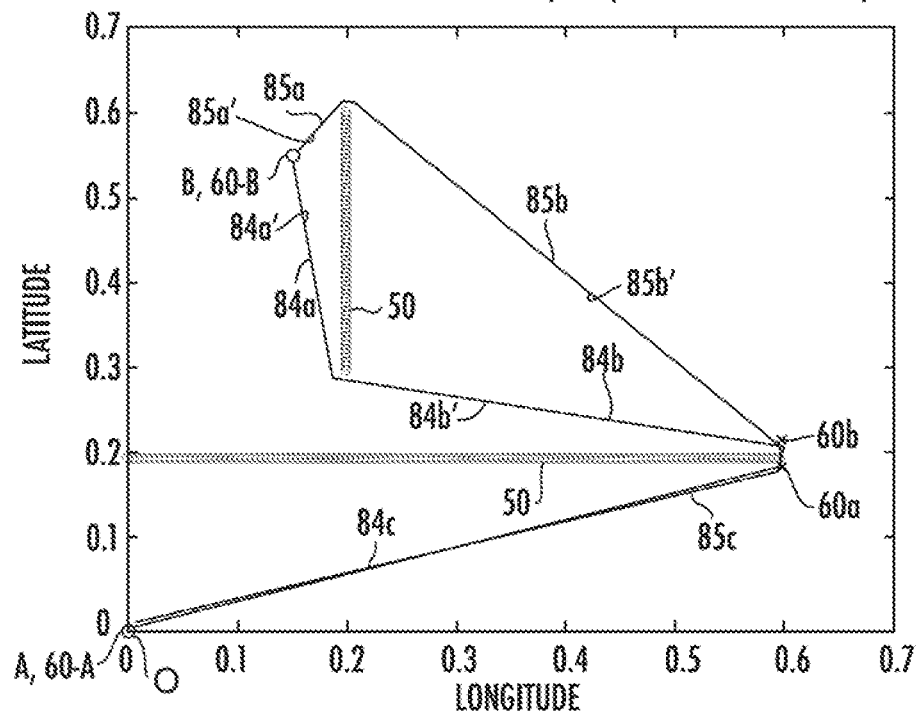

Referring to FIG. 9, this map illustrates an IA* route or path as a function of longitude and latitude, determined by a system S, in accordance with an embodiment of the present disclosure. The system S comprises a processor 10 that is operable by way of a set of executable instructions that is storable in relation to a nontransient memory device. The set of instructions comprises a plurality of cooperating algorithms (FIG. 11). The plurality of cooperating algorithms, comprising an A* algorithm, an IA* algorithm, and a Dijkstra algorithm. The IA* algorithm is implementable in relation to a reverse search (from a goal-point B to a start-point A) using parameters, such as the start-point A, the goal-point B, and a location of an obstruction, e.g., a barrier or an obstacle (as a function of time t if the obstruction is moving), wherein the directed arcs created during the reverse search are combined with the directed arcs created during the forward search. Any directed arcs created during the reverse search that duplicate directed arcs found during the forward search are discarded. FIG. 9 shows all ten of the directed arcs, corresponding to paths 84c, 85c, 85b, 85b', 85a, 85a', 84a, 84a', 84b, and 84b', returned by both the forward and the reverse searches, in accordance with an embodiment of the present disclosure.

Figure 10:
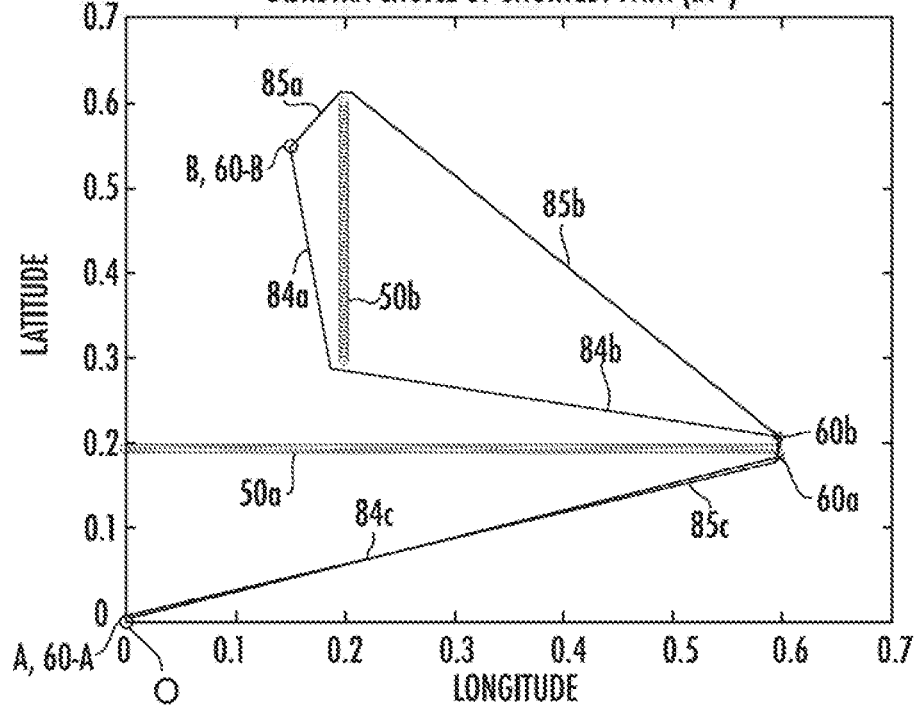

Referring to FIG. 10, this map illustrates an IA* route or path as a function of longitude and latitude, determined by a system S, in accordance with an embodiment of the present disclosure. The system S comprises a processor 10 that is operable by way of a set of executable instructions that is storable in relation to a nontransient memory device. The set of instructions comprises a plurality of cooperating algorithms (FIG. 11). The plurality of cooperating algorithms, comprising an A* algorithm, an IA* algorithm, and a Dijkstra algorithm. The IA* algorithm and the Dijkstra algorithm are implementable in relation to a forward search (from a start-point A to a goal-point B) using parameters, such as the start-point A, the goal-point B, and a location of an obstruction, e.g., a barrier or an obstacle (as a function of time t if the obstruction is moving), wherein the IA* algorithm calls the Dijkstra algorithm, wherein the IA* algorithm passes all of the directed arcs to the Dijkstra algorithm. The Dijkstra algorithm begins at the starting point of the search, e.g., the start-point A, and finds the shortest path through the directed arcs to reach the goal-point B. The Dijkstra algorithm returns an ordered set of directed arcs, defining the shortest path, to the IA* algorithm. The directed arcs within this ordered set of directed arcs are connected in that the first directed arc in the set begins at the start-point, wherein an end-point of each directed arc coincides with the start-point of the next directed arc, and wherein the final directed arc terminates at the goal point.

Still referring to FIG. 10, the overall path follows five directed arcs. These directed arcs comprise the arcs connecting the following latitude-longitude coordinate pairs: from the origin O having coordinates (0.0, 0.0), to a point having coordinates (0.19, 0.61), from the point having coordinates (0.19, 0.61) to a point having (0.21, 0.61), from the point having (0.21, 0.61) to a point having coordinates (0.61, 0.21), from the point having coordinates (0.21, 0.61) to a point having coordinates (0.61, 0.19), and from the point having the coordinates (0.61, 0.19) to a point having coordinates (0.55, 0.15). While the Dijkstra algorithm returns the shortest route through the directed arcs, noted is that the shortest route through the directed arcs may not be the shortest possible path between the starting point and the destination. The A* algorithm, which the IA* algorithm calls recursively and iteratively to create the way-points and the directed arcs between them, does not guarantee a shortest path, but may provide the best path. Given that the waypoints used as the endpoints of the directed arcs are created by using paths found by the A* algorithm, the shortest route through the directed arcs may not be on the optimal, shortest path route, but may be the best route in relation to various factors. The greedy nature of A* allows for routes to be found quickly; and, as a result, the IA* algorithm can find near-optimal routes in seconds to minutes over distances and around obstacles that would take related art algorithms, which do find shortest routes, hours or days to determine.

Referring to FIG. 11, this schematic diagram illustrates a system for planning a route over a large area, a system S comprising a processor 10 that is operable by way of a set of executable instructions storable in relation to a nontransient memory device, the set of instructions comprising a plurality of cooperating algorithms, the plurality of cooperating algorithms comprising an A* algorithm, an IA* algorithm cooperatively communicating with the A* algorithm; and a Dijkstra algorithm cooperatively communicating with the IA* algorithm, the IA* algorithm configured to iteratively and recursively call the A* algorithm to generate a plurality of directed arcs, the IA* algorithm configured to call the Dijkstra algorithm and to transmit the plurality of directed arcs to the Dijkstra algorithm, and the A* algorithm and the Dijkstra algorithm being non-interacting, in accordance with an embodiment of the present disclosure. The system S further comprises an AIS transceiver 15 disposed in relation to a vessel (not shown), the AIS transceiver 15 configured to receive Global Positioning System (GPS) signals and calculate a current position of the vessel in relation to the Earth. The processor 10 of the system S is further configured to: compare a planned route provided by executing the plurality of cooperating algorithms with the current position of the vessel as calculated by the AIS transceiver 15; and, if the current position of the vessel is found to exceed a deviation threshold in relation the planned route, notifying a user, e.g., a vessel's crew, and calculating a new planned route.

Figure 12:
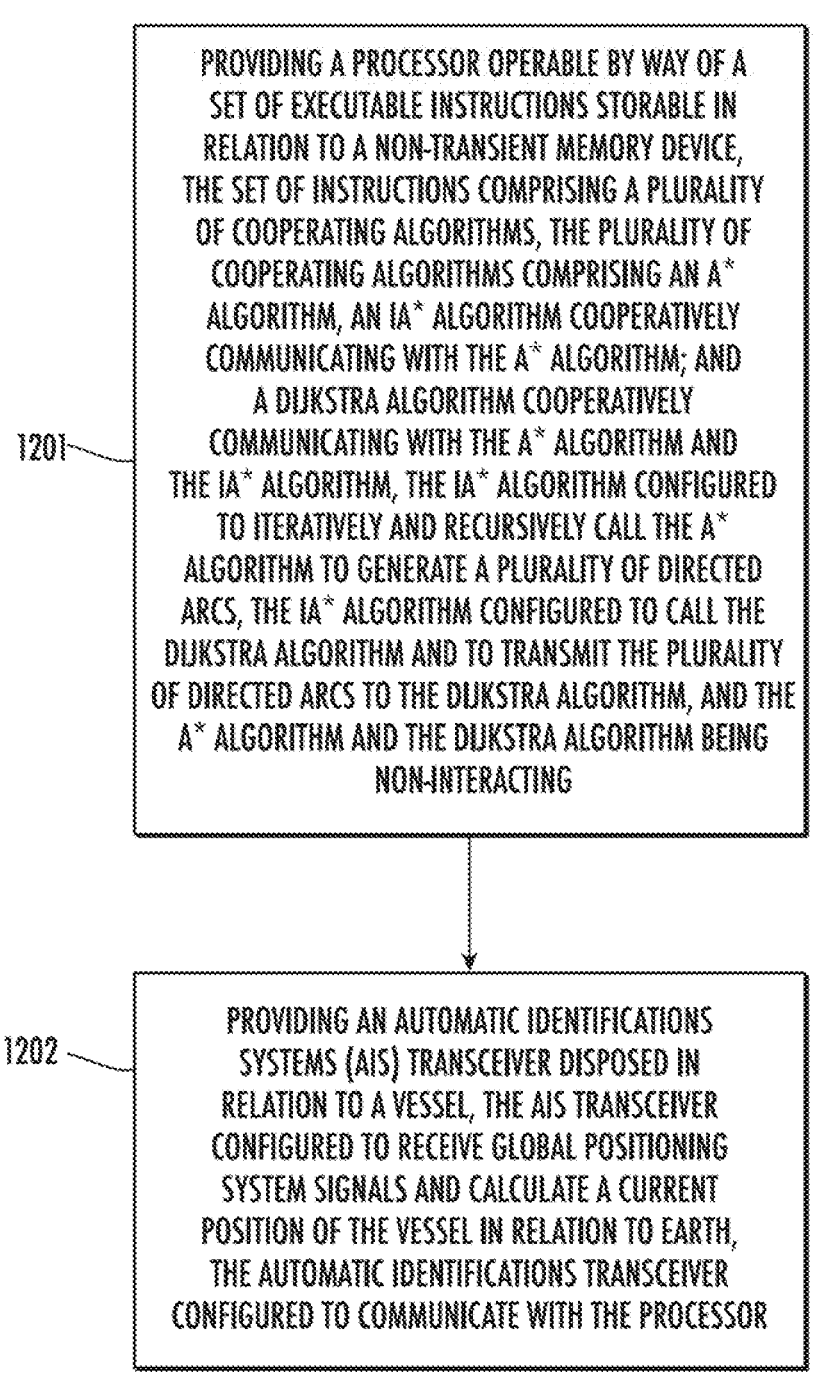
FIG. 12 is a flow diagram illustrating a method of fabricating a route planning system for planning a route over a large area, in accordance with an embodiment of the present disclosure.

Referring to FIG. 12, this flow diagram illustrates a method M1 of fabricating a system S for planning a route over a large area, the method M1 comprising providing a processor 10 that is operable by way of a set of executable instructions storable in relation to a nontransient memory device, the set of instructions comprising a plurality of cooperating algorithms, the plurality of cooperating algorithms comprising an A* algorithm, an IA* algorithm cooperatively communicating with the A* algorithm; and a Dijkstra algorithm cooperatively communicating with the IA* algorithm, the IA* algorithm configured to iteratively and recursively call the A* algorithm to generate a plurality of directed arcs, the IA* algorithm configured to call the Dijkstra algorithm and to transmit the plurality of directed arcs to the Dijkstra algorithm, and the A* algorithm and the Dijkstra algorithm being non-interacting; and configuring the processor 10 to operate by way of the set of executable instructions, as indicated by block 1201, in accordance with an embodiment of the present disclosure. The method M1 further comprises providing an AIS transceiver 15 disposed in relation to a vessel (not shown), the AIS transceiver 15 configured to receive Global Positioning System (GPS) signals and calculate a current position of the vessel in relation to the Earth, as indicated by block 1202. The processor 10 of the system S is further configured to: compare a planned route provided by executing the plurality of cooperating algorithms with the current position of the vessel as calculated by the AIS transceiver 15; and, if the current position of the vessel is found to exceed a deviation threshold in relation the planned route, notifying a user, e.g., a vessel's crew, and calculating a new planned route.

Figure 13:
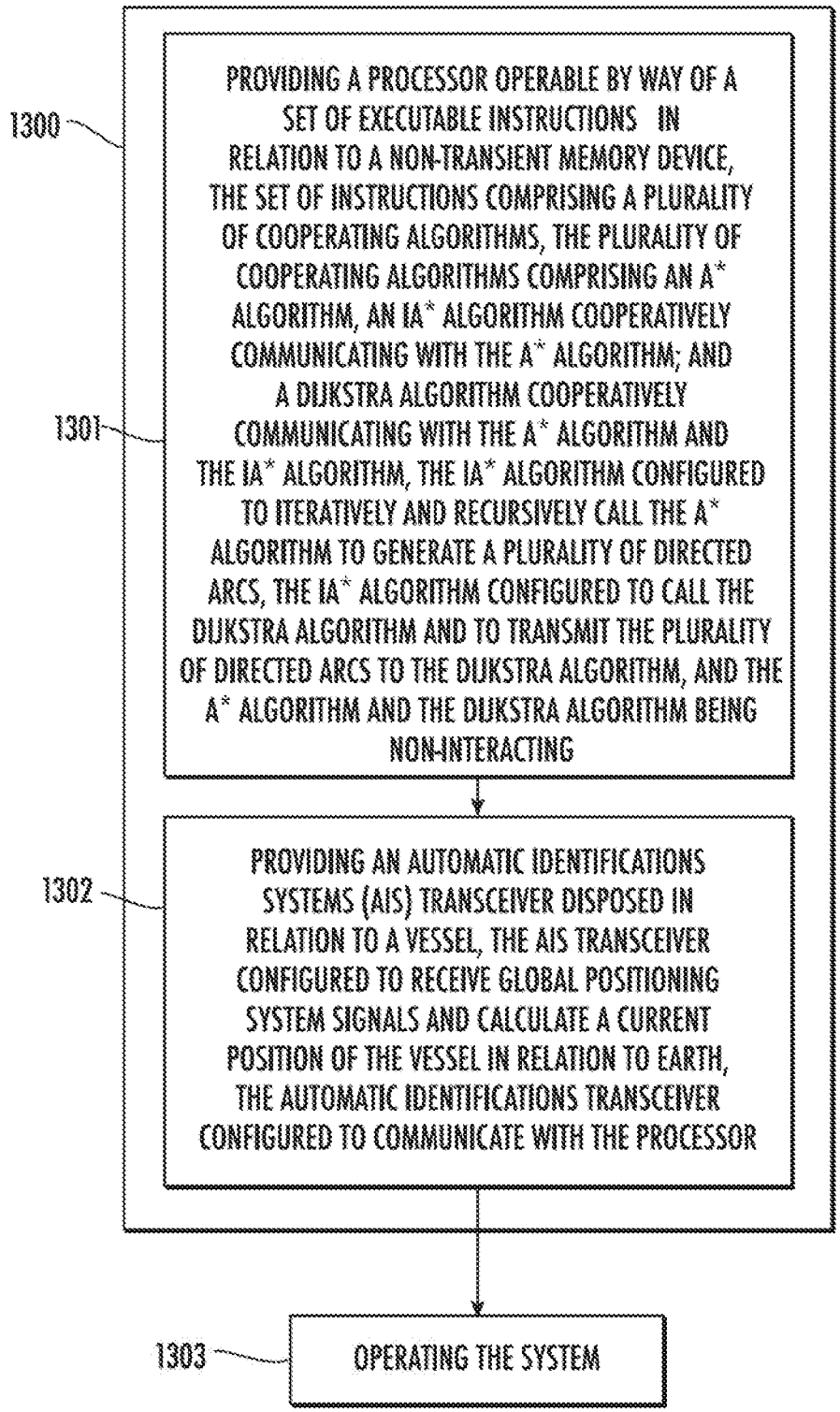
FIG. 13 is a flow diagram illustrating a method of planning a route over a large area by way of a route planning system, in accordance with an embodiment of the present disclosure.

Referring to FIG. 13, this flow diagram illustrates a method M2 of planning a route over a large area by way of a system S, the method M2 comprising: providing the system S, as indicated by block 1300; providing the system S comprising: providing a processor 10 that is operable by way of a set of executable instructions storable in relation to a nontransient memory device, the set of instructions comprising a plurality of cooperating algorithms, the plurality of cooperating algorithms comprising an A* algorithm, an IA* algorithm cooperatively communicating with the A* algorithm; and a Dijkstra algorithm cooperatively communicating with the IA* algorithm, the IA* algorithm configured to iteratively and recursively call the A* algorithm to generate a plurality of directed arcs, the IA* algorithm configured to call the Dijkstra algorithm and to transmit the plurality of directed arcs to the Dijkstra algorithm, and the A* algorithm and the Dijkstra algorithm being non-interacting; and configuring the processor 10 to operate by way of the set of executable instructions, as indicated by block 1301; and operating the system S, as indicated by block 1303, whereby a best or optimum route is planned over the large area, in accordance with an embodiment of the present disclosure. The method M2 further comprises providing an AIS transceiver 15 disposed in relation to a vessel (not shown), the AIS transceiver 15 configured to receive Global Positioning System (GPS) signals and calculate a current position of the vessel in relation to the Earth, as indicated by block 1302. The processor 10 of the system S is further configured to: compare a planned route provided by executing the plurality of cooperating algorithms with the a current position of the vessel as calculated by the AIS transceiver 15; and, if the a current position of the vessel is found to exceed a deviation threshold in relation the planned route, notifying a user, e.g., a vessel's crew, and calculating a new planned route, e.g., a new course.

Still referring to FIG. 13, operating the system S, as indicated by block 1303, comprises executing the plurality of cooperating algorithms. Executing the plurality of cooperating algorithms comprises executing the A* algorithm which is "very greedy," e.g., the A* algorithm comprises always selecting a subsequent step that is based on a set of local conditions, the A* algorithm defining a search space as a grid of locations, wherein movement within the grid is connected in a plurality of different ways. For example, the grid is connected in a manner which has a plurality of movement directions, such as four movement directions: forward, backwards, left, and right. Executing the A* algorithm comprises relating these movement directions to a map, wherein these movement directions would represent or correspond to the directions: north, south, east, and west. In another embodiment, a grid is connected in a manner which has a plurality of movement directions, such as eight movement directions (north, northeast, east, southeast, south, etc.). Obstructions, e.g., obstacles, are identified at locations in the search space when such locations within the grid are not connected to neighboring points in the grid. Executing the A* algorithm comprises returning way-points defined as locations along a path. Executing the A* algorithm comprises returning or providing a list of connected points that lead from a start-point A of a search to a goal-point B of the search.

Still referring to FIG. 13, executing the plurality of cooperating algorithms further comprises executing the IA* algorithm, wherein executing the IA* algorithm comprises calling the A* algorithm and then providing the A* algorithm with a start-point A, goal-point B, and a zero number of way-points for a search. Executing the plurality of cooperating algorithms further comprises executing the A* algorithm, wherein executing the A* algorithm comprises returning or providing a path that leads from the start-point A to the goal-point B. Executing the IA* algorithm comprises creating or generating a way-point at the start-point A of the path. Executing the IA* algorithm comprises then following this path. Executing the IA* algorithm comprises: if the path is pointed towards the goal-point B, continuing following the path; and if the path turns away from the goal-point B, watching for turns directed back toward the goal-point B. Noted is that a turn toward the goal-point B does not require that the path return to a location that would directly proceed toward the goal-point B, but merely requires that an angle between a direct path to the goal-point B of a new direction that the path is following is less than an angle between the direct path to the goal-point B and the direction that the path was following before the turn. When a turn towards the goal-point B is detected at a particular location, executing the IA* algorithm comprises creating or generating a way-point at that particular location; and continuing to follow the path. Executing the IA* algorithm comprises repeating the foregoing steps until a the path to the goal-point B has been followed. Executing the IA* algorithm comprises creating or generating a way-point 60 at the goal-point B.

Still referring to FIG. 13, executing the plurality of cooperating algorithms further comprises executing the IA* algorithm, wherein executing the IA* algorithm further comprises examining the way-points 60. Executing the IA* algorithm comprises: if only two way-points exist, e.g., the start-point A and the goal-point B, defining a direct path between the start-point A and the goal-point B, thereby creating or generating a directed arc that connects the two way-points; and saving the directed arc as data. Executing the IA* algorithm comprises skipping to the reverse path search as herein described herein. Executing the IA* algorithm comprises: if more than two way-points exist, iterating through all possible pairs of way-points to examine the paths therebetween. For each pair of way-points, executing the IA* algorithm comprises calling the A* algorithm and providing a first way-point as a start-point A and a second way-point as a goal-point B as well as all way-points thusfar created. Executing the IA* algorithm comprises examining any pair of way-points, wherein the way-point closer to the start-point A of the previous search path becomes the start-point A of the new search; and wherein the way-point closer to the goal-point B along the previous search path becomes the goal-point B of the new search. The IA* algorithm follows the same foregoing process steps, e.g., searching for way-points. Executing the IA* algorithm comprises: if no new way-points are found, creating or generating a directed arc; returning to a previous level of the search; and examining paths between pairs of way-points. Executing the IA* algorithm comprises: if new way-points are found, recursively calling the A* algorithm; and identifying further directed arcs; and if an examination of one of the paths generated by the A* algorithm reaches the location of an existing way-point, terminating the examination of that path as the remainder of that path is already known, thereby. Generating a plurality of directed arcs that connect pairs of way-points. This plurality of directed arcs are usable at a later stage in the method M2.

Still referring to FIG. 13, executing the plurality of cooperating algorithms further comprises executing the IA* algorithm, wherein executing the IA* algorithm further comprises: once all directed arcs have been found, e.g., via the foregoing steps, deleting all of the way-points; restarting the search by commencing another search, e.g., performing a reverse search, from a previous original goal-point B and ending with a previous original start-point A. In cooperatively executing the IA* algorithm in conjunction with executing the A* algorithm, the greedy nature of the A* algorithm often results in the reverse search finding a different plurality of paths than the plurality of paths that have been found during the forward search. Executing the IA* algorithm comprises cooperatively executing the A* algorithm, wherein cooperatively executing the A* algorithm comprises performing the reverse search, thereby generating a plurality of directed arcs, wherein the plurality of directed arcs are directed from the way-point that is located closer to the goal-point B of the reverse search back towards the way-point that is located closer to the origin of the reverse search, and thereby resulting in all directed arcs of the plurality of directed arcs following paths from the original start-point A of toward their original goal-point B.

Still referring to FIG. 13, executing the plurality of cooperating algorithms further comprises executing the IA* algorithm, wherein executing the IA* algorithm further comprises: once all of the directed arcs have been found from both the forward search and the reverse search, calling the Dijkstra algorithm; and executing the Dijkstra algorithm, wherein executing the Dijkstra algorithm comprises determining a shortest path through the plurality of directed arcs from the start-point A to the goal-point B; returning the shortest path as the final route; and providing the final route to a user.

Referring back to FIGS. 1-13, to solve route planning over very large areas, alternative embodiments of the system and the methods of the present disclosure involve executing the plurality of cooperating algorithms by commencing with a grid comprising a plurality of squares covering a large area; tagging each square of the plurality of squares to indicate an obstruction condition, such as (a) an entire area within each square is free of an obstruction, (b) a portion of an area within each square is partially blocked by an obstruction, and (c) an entire area within each square is completely blocked by an obstruction. If a square is tagged as having the condition (b), the system and the methods involve applying a finer-grain grid of squares (a sub-grid) to such square. The system and the methods further involve tagging each sub-square within the sub-grid to indicate an obstruction condition, such as (a) an entire area within each square is free of an obstruction, (b) a portion of an area within each square is partially blocked by an obstruction, and (c) an entire area within each square is completely blocked by an obstruction. The system and the methods further involve continuing sub-gridding to a desired spatial resolution. Executing the plurality of cooperating algorithms comprises following a best or optimum type of path for a given search space, such as on a sphere, e.g., a great circle route, across any of the large-scale squares that are free of obstacles. If the path reached a square that was completely filled with an obstacle, the algorithm would need to look perpendicular to its path to look for ways around the obstacle-filled square. When it finds a square that is free of or partially filled with obstacles, the algorithm will need to create some form of way-point. It will then, much like IA*, need to determine if the path to that way-point is unobstructed. If the path to that way-point is obstructed, then additional way-points will need to be created. When the path reaches a square that is partially filled with obstacles, the process of tracing the path drops down into a next smaller sub-grid of squares. If tracing the path drops all the way down to the finest-grained resolution, the plurality of cooperating algorithms move laterally to find a path around the obstruction, thereby providing a best or optimum path. However, the best or optimum path is not necessarily an optimal path in relation to shortest distance.

Still referring back to FIGS. 1-13, other alternative embodiments of the system and the methods of the present disclosure a feature for performing real-time updating of the planned route and for detecting anomalies in the search space; a feature for optimizing global navigation, an autopilot feature for automatic navigation based on real-time route planning data. The processor 10 is further configurable to receive and process other input parameters, such as sea current conditions, sea state, wave height, time-dependent parameters, distance, sea traffic conditions, wind state, temperature, precipitation, and the like. The processor 10 is further configurable to receive and process other input parameters, such as the handling characteristics of the vessel, e.g., the speed at which the vessel is capable of traveling in relation to different sea states. For example, while the processor 10 may determine a shortest-distance path for a vessel, based on time, the processor 10 may also determine that a longer-distance path should be taken to avoid a storm and that such longer-distance path would result in an arrival time, at the destination, sooner than taking the shortest-distance path through the storm. For example, the processor 10 may also determine that some sea states are too severe for the vessel to operate safely and effect an alert that areas in such sea states are to be avoided.

Referring back to FIGS. 1-13, benefits of the system and methods of the present disclosure include, but are not limited to: planning routes over very large areas with fine-grain resolution, such as by applying a grid spacing of $1/100^{th}$ degree on a sphere that approximates the size of the Earth, wherein the maximum distance between adjacent grid points comprises approximately 0.6 nautical miles; executing the plurality of cooperating algorithms, using the A* algorithm being "greedy," whereby planning speed is greatly increased over that of related art systems; executing the plurality of cooperating algorithms, using the IA* algorithm cooperating with executing the A* algorithm, whereby reduced computation time facilitates quickly generating a list of way-points, thereby generating planned routes much faster than routes planned by related art systems; and providing planned routes that are best or optimum in relation to a set of predetermined parameters, e.g., in addition to an optimum path around an obstruction, determining the optimum path by processing other input parameters, such as sea current conditions, sea state, wave height, time-dependent parameters, distance, sea traffic conditions, wind state, and the like.

Understood is that many additional changes in the details, materials, steps and arrangement of parts, which have been herein described and illustrated to explain the nature of the invention, may be made by those skilled in the art within the principle and scope of the invention as expressed in the appended claims.

What is claimed:

1. A route planning system, comprising:
    a processor operable by way of a set of executable instructions storable in relation to a nontransient memory device, the set of instructions comprising a plurality of cooperating algorithms, the plurality of cooperating algorithms comprising an A* algorithm, an IA* algorithm cooperatively communicating with the A* algorithm, and a Dijkstra algorithm cooperatively communicating with the IA* algorithm, the IA* algorithm configured to iteratively and recursively call the A* algorithm to generate a plurality of directed arcs, the IA* algorithm configured to transmit the plurality of directed arcs to the Dijkstra algorithm, and the A* algorithm and the Dijkstra algorithm being non-interacting; and
    a Global Positioning System (GPS) receiver disposed in relation to a vessel, the GPS receiver configured to receive GPS signals and calculate a current position of the vessel in relation to Earth, the (GPS) receiver configured to communicate with the processor.

2. The route planning system of claim 1, wherein the processor is further configured to:
    compare a planned route provided by executing the plurality of cooperating algorithms with the current position of the vessel as calculated by the GPS receiver; and,
    if the current position of the vessel is found to exceed a deviation threshold in relation the planned route, notify a user; and
    calculate a new planned route.

3. The system of claim 1, wherein executing the plurality of cooperating algorithms comprises executing the A* algorithm.

4. The system of claim 3, wherein executing the plurality of cooperating algorithms further comprises executing the IA* algorithm.

5. The system of claim 4, wherein executing the IA* algorithm comprises at least one of:
    calling the A* algorithm and providing the A* algorithm with a start-point, a goal-point, and a zero number of way-points for a search; and
    executing the A* algorithm,
    wherein executing the A* algorithm comprises at least one of:
    returning a path leading from the start-point to the goal-point;
    creating or generating a way-point at the start-point of the path; and
    following the path.

6. The system of claim 4, wherein executing the IA* algorithm comprises:

if the path is pointed towards the goal-point, continuing following the path; and
    if the path turns away from the goal-point, watching for turns directed back toward the goal-point, wherein a turn toward the goal-point requires that an angle between a direct path to the goal-point of a new direction that the path is following is less than an angle between the direct path to the goal-point and the direction that the path follows prior to the turn,
    if a turn toward the goal-point is detected at a particular location, generating a way-point at the particular location and continuing to follow the path;
    repeating the steps of continuing following the path, watching for turns directed back toward the goal-point, and generating the way-point at the particular location and continuing to follow the path until the path to the goal-point has been followed.

7. The system of claim 4, wherein executing the IA* algorithm further comprises at least one of:
    examining a plurality of way-points;
    if the plurality of way-points comprises only two way-points, defining a direct path between the start-point and the goal-point, thereby generating a directed arc that connects the only two way-points, and saving the directed arc as data;
    if the plurality of way-points comprises greater than two way-points, iterating through possible pairs of way-points to examine the paths between the possible pairs of way-points;
    calling the A* algorithm for each possible pair of way-points, thereby providing a first way-point as a start-point, a second way-point as a goal-point, and any other way-point thusfar generated;
    examining any pair of way-points, wherein the way-point closer to the start-point of the previous search path becomes the start-point of a new search, and wherein the way-point closer to the goal-point along a previous search path becomes the goal-point of the new search; and
    continuing searching for at least one new way-point.

8. The system of claim 7, wherein executing the IA* algorithm further comprises at least one of:
    if the at least one new way-point is not found, generating a directed arc, returning to a previous level of searching, and examining paths between pairs of way-points;
    if the at least one new way-point is found, recursively calling the A* algorithm, identifying at least one new directed arc; and
    if an examination of one of the paths generated by the A* algorithm reaches a location of an existing way-point, terminating examining that path as a remainder of that path is already known, thereby generating a first plurality of directed arcs that connect pairs of way-points; and
    once all directed arcs are found, deleting all way-points, commencing another search by performing a reverse search from a previous goal-point and ending with a previous start-point;
    cooperatively executing the IA* algorithm, wherein cooperatively executing the A* algorithm comprises performing the reverse search, thereby generating a second plurality of directed arcs, wherein the second plurality of directed arcs are directed from a way-point that is located closer to the goal-point of the reverse search back towards a way-point that is located closer to the start-point of the reverse search, and thereby resulting in all directed arcs of the second plurality of directed arcs following paths from the previous start-point of toward the previous goal-point.

9. The system of claim 8, wherein executing the IA* algorithm further comprises at least one of:
once all of the directed arcs have been found from both the forward search and the reverse search, calling the Dijkstra algorithm and executing the Dijkstra algorithm, wherein executing the Dijkstra algorithm comprises:
determining a shortest path through the plurality of directed arcs from the start-point to the goal-point;
returning the shortest path as the final route; and
providing the final route to a user.

10. A route planning system, comprising:
a processor operable by way of a set of executable instructions storable in relation to a nontransient memory device, the set of instructions comprising a plurality of cooperating algorithms, the plurality of cooperating algorithms comprising an A* algorithm, an IA* algorithm cooperatively communicating with the A* algorithm, and a Dijkstra algorithm cooperatively communicating with the IA* algorithm, the IA* algorithm configured to iteratively and recursively call the A* algorithm to generate a plurality of way-points each along a path where after turning away from a goal-point the path turns back towards the goal-point, the IA* algorithm configured to transmit a plurality of directed arcs through the way-points to the Dijkstra algorithm, and the A* algorithm and the Dijkstra algorithm being non-interacting; and
a Global Positioning System (GPS) receiver disposed in relation to a vessel, the GPS receiver configured to receive GPS signals and calculate a current position of the vessel in relation to Earth, the (GPS) receiver configured to communicate with the processor.

11. The system of claim 10, wherein the processor is further configured to:
compare a planned route provided by executing the plurality of cooperating algorithms with the current position of the vessel as calculated by the GPS receiver; and,
if the current position of the vessel is found to exceed a deviation threshold in relation the planned route, notify a user; and
calculate a new planned route.

12. A method of planning a route over a large area by way of a route planning system, the method comprising:
providing the route planning system comprising:
a processor operable by way of a set of executable instructions storable in relation to a nontransient memory device, the set of instructions comprising a plurality of cooperating algorithms, the plurality of cooperating algorithms comprising an A* algorithm, an IA* algorithm cooperatively communicating with the A* algorithm, and a Dijkstra algorithm cooperatively communicating with the IA* algorithm, the IA* algorithm configured to iteratively and recursively call the A* algorithm to generate a plurality of way-points each along a path where the path turns back towards a goal-point, the IA* algorithm configured to transmit a plurality of directed arcs through the way-points to the Dijkstra algorithm, and the A* algorithm and the Dijkstra algorithm being non-interacting;
a Global Positioning System (GPS) receiver disposed in relation to a vessel, the GPS receiver configured to receive GPS signals and calculate a current position of the vessel in relation to Earth, the (GPS) receiver configured to communicate with the processor; and
operating the route planning system by executing the plurality of cooperating algorithms, whereby an optimum route is planned over the large area.

13. The method of claim 12, wherein providing the processor further comprises configuring the processor to:
compare a planned route provided by executing the plurality of cooperating algorithms with the current position of the vessel as calculated by the GPS receiver; and,
if the current position of the vessel is found to exceed a deviation threshold in relation the planned route, notify a user; and
calculate a new planned route.

14. The method of claim 12, wherein executing the plurality of cooperating algorithms comprises:
commencing searching by applying a grid, the grid comprising a plurality of squares covering an area; and
tagging each square of the plurality of squares to indicate an obstruction condition, the obstruction condition comprising one of:
an entire area within each square is free of an obstruction,
a portion of an area within each square is partially blocked by an obstruction, and
an entire area within each square is completely blocked by an obstruction.

15. The method of claim 14, wherein executing the plurality of cooperating algorithms further comprises at least one of:
if a square is tagged as having the obstruction condition comprising the portion of the area within each square being partially blocked by the obstruction, applying a finer-grain grid of squares (a sub-grid) to such square;
tagging each sub-square within the sub-grid to indicate the obstruction condition, the obstruction condition comprising one of:
an entire area within each square is free of an obstruction,
a portion of an area within each square is partially blocked by an obstruction, and
an entire area within each square is completely blocked by an obstruction; and
continuing sub-gridding to a desired spatial resolution.

16. The method of claim 14, wherein executing the plurality of cooperating algorithms further comprises at least one of:
following an optimum type of path for a search space across any square tagged as having the condition of being free of then obstruction; and
if the path reached a square tagged as having a condition of being completely blocked by the obstruction, searching at least one path perpendicular to the optimum type of path to find another path around the obstruction.

17. The method of claim 14, wherein executing the plurality of cooperating algorithms further comprises, if the path reached a square tagged as having the condition of being partially blocked by the obstruction, generating another way-point and determining whether another path to the another way-point is unobstructed.

18. The method of claim 17, wherein executing the plurality of cooperating algorithms further comprises, if the another path to the another way-point is obstructed, generating an additional way-point and determining whether another path to the additional way-point is unobstructed.

19. The method of claim 17, wherein executing the plurality of cooperating algorithms further comprises:

if the path reaches a square that is partially obstructed, adjusting tracing the path in a next smaller sub-grid of squares; and if adjusting tracing the path has been performed at a finest-grained resolution, finding a path around the obstruction, thereby providing an optimum path in relation to the obstruction.

20. A route planning system, comprising:

a processor operable by way of a set of executable instructions storable in relation to a nontransient memory device, the set of instructions comprising a plurality of cooperating algorithms, the plurality of cooperating algorithms comprising an A* algorithm, an IA* algorithm cooperatively communicating with the A* algorithm; and a Dijkstra algorithm cooperatively communicating with the IA* algorithm, the IA* algorithm configured to iteratively and recursively call the A* algorithm to generate a plurality of directed arcs, the IA* algorithm configured to call the Dijkstra algorithm and to transmit the plurality of directed arcs to the Dijkstra algorithm, and the A* algorithm and the Dijkstra algorithm being non-interacting; and an automatic identification system (AIS) transceiver disposed in relation to a vessel, the AIS transceiver configured to receive global positioning system signals and calculate a current position of the vessel in relation to Earth, the AIS transceiver configured to communicate with the processor, wherein executing the plurality of cooperating algorithms comprises executing the A* algorithm, and wherein executing the A* algorithm comprises at least one of:
   always selecting a subsequent step that is based on a set of local conditions;
   defining a search space as a grid of locations, the search space having a start-point and a goal-point;
   connecting a plurality of points within the grid to facilitate identification of movement within the grid;
   identifying a location of an obstruction within the search space by determining whether a point within the grid is disconnected in relation to any neighboring point in the grid;
   returning way-points defined as locations along a path; and
   returning a list of connected points that lead from the start-point to the goal-point.

* * * * *